US005620490A

United States Patent [19]
Kawamura

[11] Patent Number: 5,620,490
[45] Date of Patent: Apr. 15, 1997

[54] DIESEL PARTICULATE FILTER APPARATUS

[75] Inventor: Hideo Kawamura, Kanagawa-ken, Japan

[73] Assignee: Isuzu Ceramics Research Institute Co., Ltd., Kanagawa-ken, Japan

[21] Appl. No.: 520,017

[22] Filed: Aug. 28, 1995

[30] Foreign Application Priority Data

Aug. 29, 1994 [JP] Japan .................................. 6-226107
Aug. 29, 1994 [JP] Japan .................................. 6-226108

[51] Int. Cl.⁶ ........................... B01D 35/18; B01D 46/00
[52] U.S. Cl. ................................ 55/267; 55/314; 55/523; 55/DIG. 10; 55/DIG. 30
[58] Field of Search .............................. 55/267, 312, 314, 55/523, DIG. 10, DIG. 30

[56] References Cited

U.S. PATENT DOCUMENTS

| 3,738,089 | 6/1973 | Brill .................................. 55/314 X |
| 4,264,344 | 4/1981 | Ludecke et al. ..................... 55/313 |
| 4,686,827 | 8/1987 | Wade et al. ..................... 55/DIG. 30 |
| 4,813,231 | 3/1989 | Bykowski ..................... 55/DIG. 30 |
| 4,829,766 | 5/1989 | Henkel ............................ 55/523 X |
| 4,875,336 | 10/1989 | Hayashi et al. ................... 55/314 X |
| 4,940,476 | 7/1990 | Buck ............................. 55/DIG. 30 |
| 5,085,266 | 2/1992 | Arold et al. ....................... 55/267 X |
| 5,171,341 | 12/1992 | Merry ......................... 55/DIG. 30 |
| 5,174,968 | 12/1992 | Whittenberger ............... 55/DIG. 30 |
| 5,224,973 | 6/1993 | Hoppenstedt et al. ................ 55/267 |
| 5,250,094 | 10/1993 | Chung et al. ......................... 55/523 |
| 5,298,046 | 3/1994 | Peisert ......................... 55/DIG. 30 |
| 5,409,669 | 4/1995 | Smith et al. ....................... 55/267 X |
| 5,453,116 | 9/1995 | Fischer et al. .................. 55/DIG. 30 |
| 5,454,845 | 10/1995 | Anahara et al. ...................... 55/267 |
| 5,457,945 | 10/1995 | Adiletta ......................... 55/DIG. 30 |
| 5,497,620 | 3/1996 | Stobbe ............................. 55/523 X |

FOREIGN PATENT DOCUMENTS

| 2600907 | 1/1988 | France . |
| 3800723A1 | 7/1987 | Germany . |
| 4305915 | 11/1994 | Germany ............................ 55/267 |
| 2256812 | 10/1990 | Japan . |
| WO03/00503 | 1/1993 | WIPO . |

Primary Examiner—Robert Spitzer
Attorney, Agent, or Firm—Browdy and Neimark

[57] ABSTRACT

This diesel particulate filter apparatus comprises a main filter, a sub-filter provided in a central portion of the main filter, and a bypass cylinder interposed between the main filter and sub-filter. A filter body constituting the main filter is made of long ceramic fiber, and the surface of the filter body is covered with a metal net, which is then fixed thereto. A heat resisting metal coil is provided on the surface of the filter body which is at the exhaust gas introducing side, and a ceramic fiber twisting is wound around and fixed to the filter body. A bypass valve adapted to be opened and closed by an actuator is provided on an exhaust gas introducing side of the sub-filter, and an admission port of the sub-filter is opened and closed by the bypass valve. Each wire rod constituting the metal net comprises a core member formed out of a material containing Ni and Cr and having a low resistance temperature coefficient and a large specific electric resistance value, and an intermediate member coating the core member and formed out of a material having a high resistance temperature coefficient and a small specific electric resistance value. The wire rod is covered with a corrosion resisting layer of coating of $Al_2O_3$ or $ZrO_2$.

19 Claims, 3 Drawing Sheets

DIESEL PARTICULATE FILTER APPARATUS

BACKGROUND OF THE INVENTION

1. Field of the Invention

This invention relates to a diesel particulate filter apparatus adapted to collect by a filter an exhaust gas discharged from a diesel engine, and incinerating the same.

2. Description of the Prior Art

The combustion in a diesel engine is based on the heterogeneous mixing carried out by injecting a fuel into high-temperature and high-pressure air. In the heterogeneous mixing, air and a fuel are not uniformly mixed unlike those in a homogeneous gaseous mixture. Therefore, the carbon component in the fuel turns into soot and HC due to the high combustion heat, and they are agglomerated into particulates, which are discharged to the outside to cause the contamination of the environment.

In a conventional exhaust emission control apparatus, a filter is formed to a large area, and the carbon in the exhaust gas from an engine is accumulated on a front surface of the filter, whereby the carbon is collected. In order to incinerate the carbon accumulated on the filter, a heater is provided on a part of the filter, and the accumulated particulates including carbon are incinerated, whereby the filter is regenerated.

Japanese Patent Laid-Open No. 256812/1990 discloses a particulate trap which can be electrically regenerated. This particulate trap comprises a gas permeable support, a plurality of fiber layers of ceramic fiber, and a heater, and the fiber layers and heater are provided in a space extending radially from the gas permeable support. An exhaust gas is introduced into clearances between the fiber layers, and the particulates in the exhaust gas are collected in a position near the heater, the collected particulates being incinerated by supplying an electric current to the heater. The material for the ceramic fibers is selected from continuous molten silica, glass, alumina silica, zirconia silica, alumina chromia, titania, graphite, silicon carbide and alumina boria silica. The ceramic fiber is directly braided on or wound around the surface of the gas permeable support or heater.

It is necessary that the diesel particulate filter be made compact so that it can be mounted on a vehicle conveniently and collect particulates, such as carbon, soot and HC efficiently. In general, the particulates are synthetic products of carbon and hydrocarbon contained in an exhaust gas from a diesel engine, and the size thereof varies from several $\mu$m to several ten $\mu$m. Although the particulates react with oxygen and are burnt easily, a high temperature is required for the burning thereof. The particulates cannot be burnt completely at the temperature of an exhaust gas alone.

A conventional diesel particulate filter apparatus is provided with two filters of the same size arranged in parallel with a flow of an exhaust gas. When one filter is clogged with collected particulates, the exhaust gas is supplied to the other filter, while the air required for the incineration of particulates is sent to the clogged filter so as to heat the filter and incinerate the collected particulates, whereby the filter is regenerated. Regarding the conventional diesel particulate filter apparatuses, various particulate and smoke eliminating apparatuses have been developed but all of these apparatuses have a complicated construction and a troublesome function, so that they cannot be put to practical use under the present conditions.

In a diesel particulate filter apparatus, the particulates accumulated on a filter are incinerated by supplying an electric current to a heater provided on a surface of the filter. In such an apparatus, it is necessary that the heater has a thermal resistance of not lower than 900° C., and a large resistance temperature coefficient which indicates that a resistance value becomes higher as the temperature increases. For example, when an incineration temperature is increased during the incineration of the particulates accumulated on a filter, electric power continues to be supplied to a heater even if the portion of the heater on which the carbon begins to be burnt by the electric current supplied to the heater comes to have a locally increased temperature. Consequently, the temperature of such a portion of the heater further increases, so that metal wires constituting the heater are burnt and broken.

Accordingly, if an electric current stops flowing to the portion alone of the heater provided on the filter at which the temperature has increased to a high level locally, a local temperature rise in the heater is restrained, and the heater is necessarily maintained at a uniform temperature. However, a material having the above-mentioned characteristics of a heater and a high resistance temperature coefficient, a high volume resistance value and, moreover, a heat resistance and a high corrosion resistance does not exist.

SUMMARY OF THE INVENTION

An object of the present invention is to solve these problems, and provide a diesel particulate filter apparatus of a compact construction adapted to collect particulates, such as carbon, soot and HC contained in an exhaust gas discharged from a diesel engine, by a filter provided in an exhaust system for the diesel engine, the particulates collected on the filter being incinerated, characterized in that a filter body constituting the filter is formed by laminating long ceramic fiber at random and weaving the fiber locally, the inner and outer surfaces of the filter body being covered with metal nets, the metal net located upstream a flow of the exhaust gas being formed into a heater, the exhaust gas discharging side of the filter body being reinforced with ceramic fiber twisting, whereby the rigidity of the apparatus is increased with the thermal capacity thereof maintained at a low level.

Another object of the present invention is to provide a diesel particulate filter apparatus characterized in that a heater is made of heat resisting metal wires formed out of a combination of a material of a high resistance temperature coefficient, a material of a large volume resistance value and a material having a heat resistance, a high rigidity and a corrosion resistance, whereby the temperature of the heater does not become locally high to enable the particulate heating temperature to be self-controlled at a uniform level.

The present invention relates to a diesel particulate filter apparatus (DPF apparatus) characterized in that it comprises cylindrical filter bodies formed by laminating long ceramic fiber materials, metal nets provided on outer surfaces of the filter bodies and formed at the portions thereof which are upstream a flow of an exhaust gas out of at least a conductive material, heat resisting metal coils arranged in contact with the filter bodies and coated with a ceramic material, and fiber twistings wound around and fixed to the filter bodies and comprising ceramic or ceramic material-coated threads.

The filter bodies are formed cylindrically by plate type or bellows-like long fiber materials. The filter bodies formed cylindrically by bellows-like long fiber materials are provided with ceramic twistings on the outer side thereof and heater-forming heat resisting metal coils on the inner side thereof.

In a structure in which an exhaust gas flows from the inner side of the cylindrical filter bodies to the outer side thereof, fiber twistings are wound around the outer sides of the filter bodies, and heat resisting metal coils are provided on the inner sides thereof. In a structure in which an exhaust gas flows from the outer side of the cylindrical filter bodies to the inner side thereof, fiber twistings are wound on the inner sides of the filter bodies, and heat resisting metal coils are provided on the outer sides thereof.

The metal nets referred to above are provided in an opposed state on both sides of the filter bodies. The cross-sectional area of the wire rods of the heat resisting metal coils is set to not more than 1/3 of the sum of a total cross-sectional areas of the metal nets.

The wire rods of the heat resisting metal coils are preferably coated with Ni, $Al_2O_3$ or $ZrO_2$, and series-connected to the metal nets.

In this DPF apparatus, the filter bodies are formed by a material obtained by laminating long ceramic fiber materials of 8–20 μm in diameter made of SiC or SiC containing additives, such as Ti and Ta, and weaving the fiber materials while locally crossing them one another. Metal nets are provided on the inner and outer surfaces of the filter bodies, and ceramic material-coated heat resisting coils and ceramic fiber twistings are wound around the exhaust gas introducing sides and exhaust gas discharging sides respectively of the filter bodies. Therefore, the filter bodies can be formed to a small thermal capacity, and the rigidity thereof can be increased.

Accordingly, when an exhaust gas is introduced into the filter bodies in this DPF apparatus, the particulates, such as carbon and smoke contained in the exhaust gas are collected by and accumulated on the filter bodies. When a predetermined amount of particulates have been accumulated on the filter bodies, an electric current is supplied to the heat resisting metal coils, and the filter bodies are thereby heated so as to incinerate the particulates collected thereby. By thus incinerating the particulates, the filter bodies are regenerated. Owing to the above-described construction, the thermal capacity of the filter bodies can be set small, and the temperature of the filter bodies can be increased instantly with the smallest possible electric power. This enables the particulates to be incinerated completely, the level of the electric power supplied to the metal coils to be minimized, and the incineration of the particulates to be done speedily with high-temperature heat.

In this DPF apparatus, the filter bodies comprise a main filter, and a sub-filter provided in a bypass cylinder, which is set in the central portion of the main filter, so as to extend in parallel with a flow of exhaust gas with respect to the main filter. A bypass valve for opening and closing the bypass cylinder is provided on the exhaust gas introducing side, i.e. the upstream side of the sub-filter, this bypass valve having an actuator for opening and closing itself. The air passage resistance of the sub-filter is set lower than that of the main filter. When the bypass valve is then opened, a large amount of exhaust gas flows through the sub-filter, and a small amount of exhaust gas through the main filter as well which is collecting particulates, so that $O_2$ necessary for the incineration of the particulates on the main filter can be supplied.

Therefore, while the bypass valve is closed, the exhaust gas is subjected to a cleaning treatment smoothly in the main filter, and the particulates in the exhaust gas are collected by the main filter. When the temperature of the main filter which is collecting particulatesis not lower than a predetermined level with the exhaust resistance thereof higher than a predetermined level, the sub-filter is opened immediately, and an electric current starts being supplied to the heater.

When the main filter is regenerated, an electric current is merely supplied to the metal nets with the bypass valve opened, and it is not necessary to send the air for incinerating the particulates collected on the main filter theretoby utilizing a pump additionally provided. Consequently, a very small amount of exhaust gas is sent to the main filter owing to the balance of the air passage resistance of the main filter and that of the sub-filter. Namely, a large amount of exhaust gas flows through the sub-filter, and a small amount of exhaust gas the main filter. Therefore, since an air/fuel ratio is high in a diesel engine, $O_2$ for incinerating the particulates collected on the main filter can be supplied.

When the exhaust gas is introduced into the main filter with the bypass valve closed, the exhaust gas leaking from the bypass valve flows through the sub-filter, and the particulates collected on the sub-filter during the regeneration of the main filter are supplied similarly to the sub-filter. Moreover, since the sub-filter is provided in the inner portion of the main filter, the filter structure can be made compact, and the sub-filter can be heated by supplying an electric current to the heat resisting metal coil and the metal net provided thereon, without being cooled with the main filter positioned on the outer side of the sub-filter, the particulates collected on the sub-filter being incinerated with $O_2$ contained in the exhaust gas.

Since a very small amount of air is contained in the exhaust gas from a diesel engine due to the excess air factor constituting the characteristics of the diesel engine, the particulates collected on the main filter are incinerated by this air. Accordingly, an air supply means for the incineration of collected particulates is not required, and the filter apparatus can be formed to a compact and simple structure. Moreover, the mechanism for treating the exhaust gas discharged from the diesel engine is very simple and capable of cleaning the exhaust gas continuously. This filter apparatus can be mounted excellently even in, for example, a portion of a vehicle which is under specially severe conditions.

In this DPF apparatus, the metal nets constituting the heaters provided on the surfaces of the filter bodies are formed by wire rods comprising core members of a material of a low resistance temperature coefficient and a large specific electric resistance value, and outer members of layers of coating formed out of a material of a high resistance temperature coefficient and a small specific electric resistance value so as to cover the core members. The metal nets have a self-current-controlling function. When an electric current is supplied to the metal nets, they can be heated uniformly, and the particulates collected on the filter bodies can be incinerated uniformly and excellently without being locally overheated. Therefore, when an electric current is supplied to the heaters, the temperature thereof can be maintained at a uniform level, and a locally overheated region does not occur during the incineration of the particulates, so that the durability of the heaters can be improved.

The core members are formed by a steel material containing 18.8% each of Ni and Cr, or nichrome wires containing 60–80% of Ni and 12–20% of Cr, and the outer members Ni. The wire rods are covered with a layer of coating comprising corrosion resisting $Al_2O_3$ or $ZrO_2$. The cross-sectional areas of the core members comprising Ni—Cr alloy, outer members comprising Ni and layer of coating of $Al_2O_3$ or $ZrO_2$ account for 60–85%, 40–15% and 10–20%, respectively of an overall cross-sectional area of the wire rods.

Since the wire rods of Ni—Cr steel constituting the metal nets have a heat resistance, a high rigidity and a large volume resistance value, they are used to make the core members of the metal nets. The outer surfaces of the core members are plated or coated with Ni to form outer members. The Ni material constituting the outer members does not have as it is a sufficient oxidation resistance, especially, oxidation resistance to nitric acid, and is not preferable to be brought into direct contact with an exhaust gas from a diesel engine. Therefore, the outer surfaces of the outer members are coated with Al so as to form a layer of coating of $Al_2O_3$ having a high affinity for Ni on Ni. The Al of the layer of coating is converted into $Al_2O_3$ by being subjected to oxidation treatment, to form an oxidation resisting film.

The metal nets are series-connected to latticed composite wire rods of Ni—Cr steel material, so that the metal nets and composite wire rods can be furnished with an electric power self-controllability. Since the wire rods of the core members can be formed selectively out of a material of a large volume resistance value, the dimensions of the metal nets can be set small, and the thermal capacity of the filter bodies low. Moreover, the composite wire rods can be utilized as reinforcing coils. This enables the rigidity of the filter bodies to be improved. Accordingly, when the particulates collected on the filter bodies are incinerated, the level of electric power supplied to the metal coils may be set low, and the incineration of the particulates can be carried out speedily at a high temperature.

DESCRIPTION OF THE PREFERRED EMBODIMENT

Figure 1:
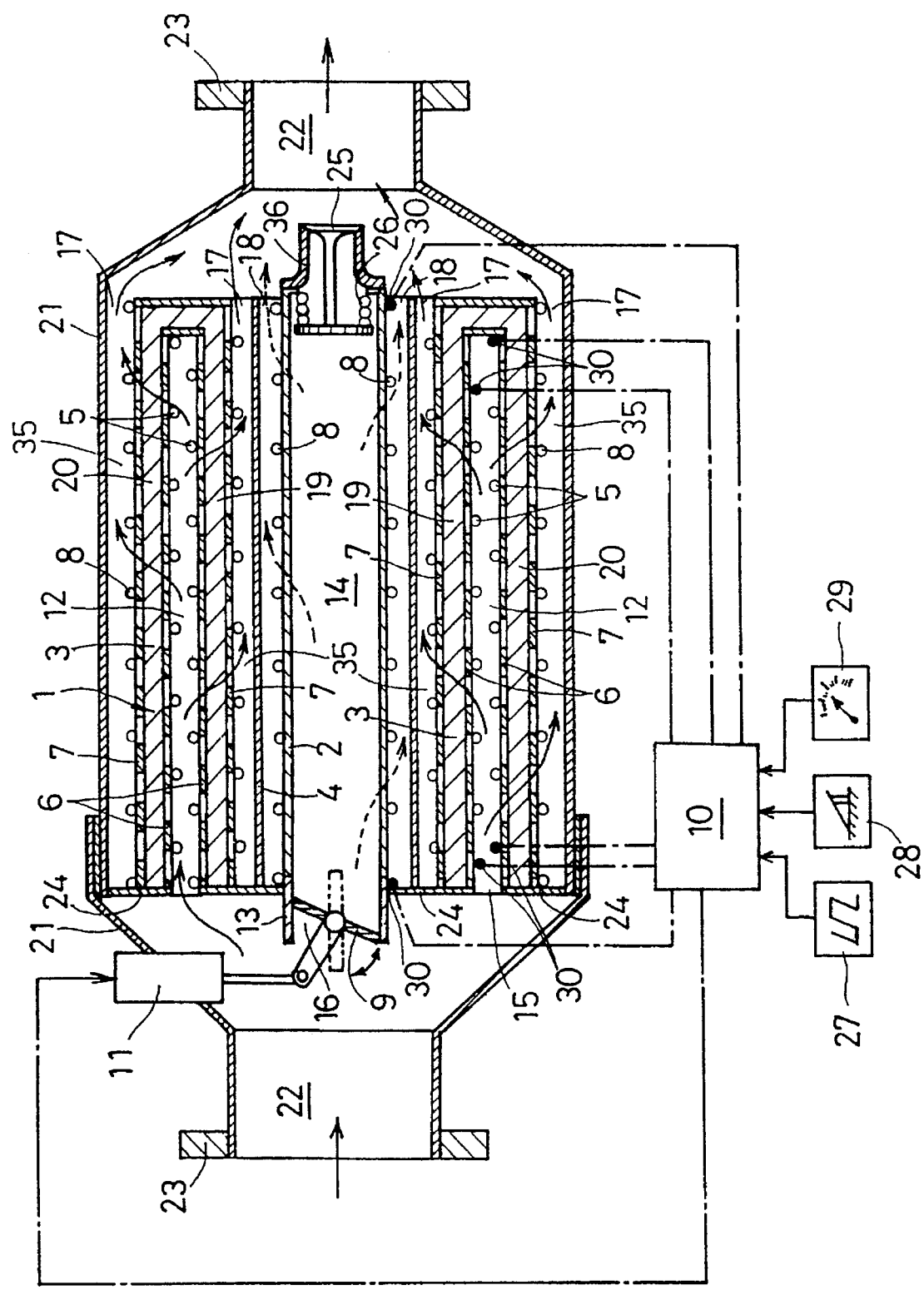
FIG. 1 is a sectional view showing an embodiment of the construction of the diesel particulate filter apparatus according to the present invention with a bypass valve closed.

An embodiment of the diesel particulate filter apparatus (which will hereinafter be referred to as a DPF apparatus) according to the present invention will now be described with reference to the drawings.

This DPF apparatus is provided in an exhaust system for a diesel engine, and can collect the particulates, such as carbon, soot and smoke contained in an exhaust gas and incinerate the collected particulates. This DPF apparatus has a case 21 connected to an exhaust pipe (not shown) of a diesel engine via flanges 23. In an exhaust gas passage 22 formed in the case 21, a main filter 1 and a sub-filter 2 which are capable of collecting particulates are provided so as to be separated from each other by a bypass cylinder 4 in the direction of a flow of an exhaust gas and extend concentrically in parallel with the flow of the exhaust gas from an inlet side to an outlet side. The main filter 1 comprises an inner and outer cylinders 19, 20, i.e. cylindrical members extending concentrically with and in parallel with a flow of exhaust gas and in two layers. The bypass cylinder 4 is provided on the inner side of the inner cylinder 19 of the main filter 1, and the sub-filter 2 on the inner side of the bypass cylinder 4.

At the exhaust gas inlet and outlet sides of the exhaust gas passage 22, shielding plates 24 are provided which close the inlet and outlet sides of the exhaust gas passage 22 except inlets 15, 16 of the main filter 1 and sub-filter 2 and outlets 17, 18 thereof. A support pipe 13 is joined to an exhaust gas introducing side of the sub-filter 2, and a bypass valve 9 for opening and closing an admission port of the sub-filter 2 is provided in the support pipe 13. The bypass valve 9 is opened and closed by an actuator 11 which is driven by a command from a controller 10. The bypass valve 9 may be provided with a through bore from which a small amount of exhaust gas leaks for the regeneration of the sub-filter 2, or the bypass valve itself may be provided in the bypass passage 14 to permit leakage from the valve. A support pipe 36 is fixed to an outlet end portion of the sub-filter 2, and provided therein with a pressure valve, i.e. a safety valve 25 for closing an end portion thereof by a resilient force of a spring 26.

This DPF apparatus is characterized in that, especially the main filter 1 and sub-filter 2 are formed by filter bodies 3, the inner and outer surfaces of at least the exhaust gas introducing side portions of the filter bodies 3 being provided with metal nets 6, 7 made of a conductive material, ceramic material-coated heat resisting metal coils 5 being provided on the exhaust gas introducing sides of the filter bodies 3, fiber twistings 8 which comprise threads of a ceramic material or threads coated with a ceramic material being wound around exhaust gas discharging side portions of the filter bodies 3. The filter bodies 3 are formed cylindrically by plate type materials made of laminated long ceramic fiber materials of 8–20 μm in diameter comprising SiC or SiC in which an additive, such as Ti or Ta is mixed. When an exhaust gas is introduced into the filter bodies 3, the particulates contained therein are collected in the crossed regions of fibers and deposited sequentially among the fibers, so that the pressure of the exhaust gas at the upstream side of the filter bodies 3 increases.

The metal net 6 is provided on the upstream side portion with respect to a flow of exhaust gas of the main filter 1, and the metal net 7 on the downstream side portion with respect thereto of the main filter 1. The metal nets 6, 7 are formed out of heat resisting steel having a corrosion resistance and containing Ni, Cr and Al, and they are provided on the outer surfaces of the filter bodies 3 and can be fixed to the main filter 1 suitably by staplers. When the main filter is formed by two cylindrical filters, i.e. inner and outer filters 19, 20, a main exhaust gas introducing passage 12 positioned on the exhaust gas introducing side is formed between the inner and outer cylinders 19, 20, and main exhaust gas discharging passages 35 positioned on the exhaust gas discharging side and adapted to discharge the exhaust gas passed through the main filter 1 are formed on the inner side of the inner cylinder 19 and on the outer side of the outer cylinder 20.

Figure 2:
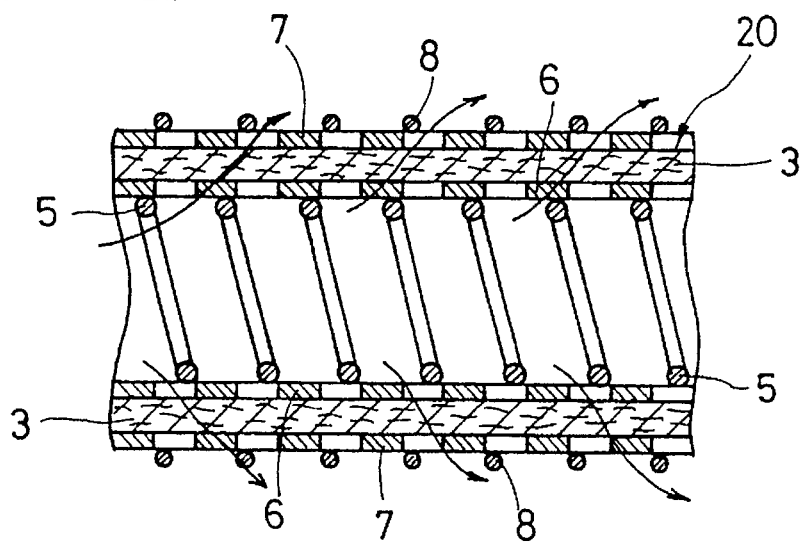
FIG. 2 is an enlarged section showing an example of an outer cylinder of a main filter in the diesel particulate filter apparatus of FIG. 1.

For example, the outer cylinder 20 will be described. As shown in FIG. 2, the metal nets 6, 7 are fixed to the inner and outer surfaces of the outer cylinder 20 by staplers, and fiber twistings 8 comprising a thread obtained by twisting long ceramic fiber or twisting long ceramic material-coated fiber is wound rather coarsely around the outer surface of the outer cylinder 20. A helical, resilient heat resisting metal coil 5 is inserted into the inside of the outer cylinder 20 so as to hold the metal net 6. The metal net 6 provided on the inner surface of the outer cylinder 20, i.e., on the exhaust gas introducing side is formed out of a conductive material. The metal net 7 provided on the outer surface of the outer cylinder 20, i.e., on the exhaust gas discharging side is not necessarily formed out of a conductive material. Anyway, the metal nets 6, 7 have the function of retaining the filter body 3.

The net 6 of a heat resisting metal is formed so that the energization thereof is controlled by a command from the controller 10 so as to incinerate the particulates collected on the main filter 1. The heat resisting coil 5 and metal net 6 may be electrically series-connected. The sub-filter 2, which is not shown, is capable of burning the particulates collected thereon, by providing the metal net 6 and heat resisting metal coil 5 thereon in the same manner as in the main filter 1. The metal nets 6, 7 extend over the whole surface of the portion of the exhaust gas passage 22 which is on the upstream side of the main filter 1, and over the whole surface of the whole surface of the portion of the bypass passage 14 which is on the upstream side of the sub-filter 2, the metal nets being connected to a power source 10E (FIG. 7), which is provided in the controller 10, through electrode terminals 30.

Figure 3:
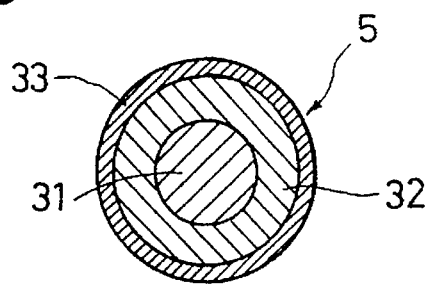
FIG. 3 is an enlarged section showing a metal net-forming wire rod which constitutes heat resisting metal coils for the diesel particulate filter apparatus of FIG. 1.

The heat resisting metal coil 5 is preferably formed out of Ni-based metal so that it can uniformly heat the surface of the main filter 1. The heat resisting metal coil 5 comprises, for example, a core member 31 of Ni—Or alloy, an intermediate member 32 coating the core member 31 and formed out of a material of a large resistance temperature coefficient, such as Ni, and a covering member 33 coating the intermediate member 32 and formed out of corrosion resisting $Al_2O_3$ or $ZrO_2$ as shown in FIG. 3.

In this DPF apparatus, a sensor for detecting an exhaust gas pressure or a particulate accumulation sensor (not shown) is provided on the inlet side of the exhaust gas passage 22 in the case 21, and the information on the exhaust gas detected by the sensor is inputted into the controller 10. The controller 10 is provided with a revolution sensor 27 for detecting the operational condition of the engine, i.e. an engine revolution speed, a load sensor 28 for detecting an engine load, and a temperature sensor 29 for detecting the temperature of the exhaust gas. The controller 10 is adapted to receive signals representative of the operational condition of the engine from these sensors, judge the particulate collecting condition corresponding to an exhaust gas pressure determined correspondingly to the operational condition of the engine in advance, or a detected value of a particulate accumulation amount, and control the timing of opening of the bypass valve 9, i.e. the timing of regenerating the main filter 1.

In this DPF apparatus, for example, the air passage resistance of the sub-filter 2 is set comparatively smaller than that of the main filter 1. The air passage resistance of the main filter 1 and sub-filter 2 can be secured by changing the material for and the density of the filters. This can be effected by setting, for example, the diameter of the fiber constituting the sub-filter larger than that of the fiber constituting the main filter 1. When the main filter 1 or sub-filter 2 is heated by applying an electric current to the heat resisting metal coil 5 and metal net 6, the particulates collected on the main filter 1 or sub-filter 2 are heated, and turn into $CO_2$ and $H_2O$ gases, which are incinerated by utilizing $O_2$ in the exhaust gas. During the regeneration of the main filter 1, the greater part of the exhaust gas flows through the sub-filter 2 initially with a very small amount of exhaust gas flowing through the main filter 1. As the regeneration of the main filter 1 progresses, the air passage resistance value of the main filter 1 becomes gradually smaller, and the particulates in the exhaust gas are collected by the sub-filter 2, whereby the air passage resistance value of the sub-filter 2 becomes gradually large. Therefore, the air passage resistance of the main filter 1 and sub-filter 2 is balanced with each other as the regeneration of the main filter 1 progresses, whereby the exhaust gas flows to the main filter 1. This apparatus is designed so that the exhaust gas and air do not flow excessively to the main filter 1 during the regeneration of the main filter 1.

This DPF apparatus is constructed as described above, and operated as follows. A diesel engine is driven, and an exhausts gas is sent to the exhaust gas passage 22 through an exhaust pipe. During this time, the bypass valve 9 is closed, and the exhaust gas is sent from the inlet 15 of the exhaust gas passage 22 into the main exhaust gas passage 12, from which the exhaust gas flows through the main filter 1, in which particulates, such as soot, carbon, smoke, HC and SOx contained in the exhaust gas are collected, a clean exhaust gas being discharged to the outlet 17. The collected particulates are accumulated on the main filter 1, and the air passage resistance of the main filter 1 increases gradually with the lapse of collection time. The controller 10 receives detected signals from an exhaust gas pressure sensor or a sensor (not shown) capable of detecting an amount of accumulation of particulates, such as a particulate accumulation sensor, the revolution sensor 27, load sensor 28 and temperature sensor 29, judges the operational condition of the engine from these detected values, and determines a certain level of a detected value of preset exhaust gas pressure at which the actuator 11 should be operated to open the bypass valve 9, or a certain level of a detected value of collected amount of the particulates on the main filter 1 at which the actuator 11 should be operated to open the bypass valve 9.

When a predetermined amount of particulates are collected on the main filter 1, the controller 10 sends out a command for operating the actuator for the purpose of regenerating the main filter 1, and the bypass valve 9 is opened by an operation of the actuator 11. When the bypass is opened, the greater part of the exhaust gas flows through the sub-filter 2 via the bypass passage 14, and a very small amount of exhaust gas is sent from the exhaust gas passage 22 to the main filter 1. The controller 10 further sends out a command for supplying an electric current to the metal net 6 or heat resisting metal coil 5 and metal net 6 through the electrode terminals 30, and the metal net 6 is then heated to cause the main filter 1 to be heated. In the meantime, the particulates contained in the exhaust gas passing through the sub-filter 2 are collected thereby, and the collected particulates are accumulated thereon.

When the main filter 1 is heated, the particulates collected on the main filter 1 are turned into $CO_2$ and $H_2O$ and incinerated by using the air contained in the small amount of exhaust gas passing through the main filter 1. The particulates are thus turned into a gas and discharged from the outlet 17 to complete the regeneration of the main filter 1. The completion of the regeneration of the main filter 1 is judged by the controller 10 on the basis of exhaust gas pressure value set in advance with the operational condition of the engine taken into consideration, and the incineration time with respect to an amount of deposition of particulates. When the regeneration of the main filter 1 is completed, the controller 10 gives a command for operating the actuator 11 and close the bypass valve 9. When the bypass valve is closed, the exhaust gas flows from the exhaust gas passage 22 and through the main filter 1, whereby a regular exhaust gas processing operation, i.e. a particulate collecting operation by the main filter 1 starts being carried out. During this time, a very small amount of exhaust gas is sent to the bypass passage 14 through a through bore or clearance formed in the bypass valve 9. The particulates collected on the sub-filter 2 are incinerated by utilizing the air contained in a small amount of exhaust gas flowing from the bypass passage 14 and through the sub-filter 2, whereby the sub-filter 2 is regenerated. In this diesel particulate filter apparatus, this operation cycle is repeated, and an exhaust gas cleaning process is thereby carried out continuously.

Figure 4:
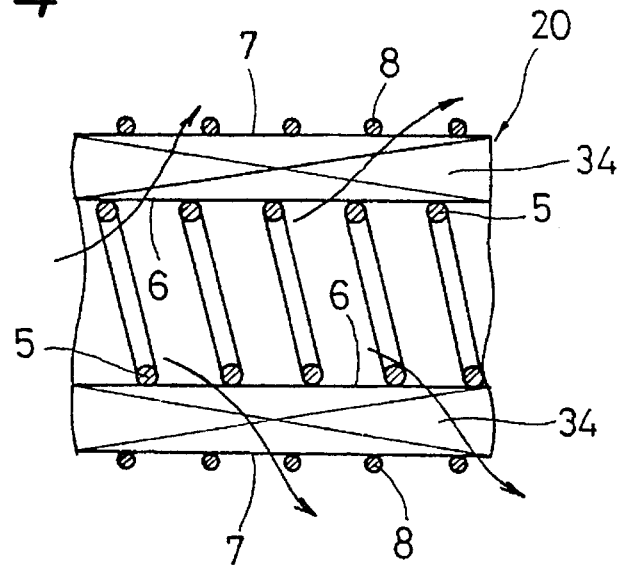
FIG. 4 is an enlarged section showing another example of the outer cylinder of the main filter in the diesel particulate filter apparatus of FIG. 1.

Another example of the outer cylinder will now be described with reference to FIG. 4. This example has substantially the same construction as the previously described example except the construction of its filter bodies. The parts of the example of FIG. 4 which are identical with those of the previously-described example are designated by the same reference numerals, and the duplication of descriptions thereof is omitted. In the example of FIG. 4, the filter bodies 34 are formed to bellows-like cylindrical structures in which long fiber material is bent at the radially inner and outer sides thereof. Since the filter bodies 34 are formed to bellows-like cylindrical structures, the areas thereof for collecting particulates in the exhaust gas can be increased, so that a particulate collecting efficiency can be improved. In the fitter bodies 34 formed to bellows-like cylindrical structures out of a long fiber material, ceramic fiber twistings 8 are provided on the outer sides thereof, and heat resisting metal coils 5 on the inner sides thereof. The function and operation of the DPF apparatus in this embodiment are identical with those of the DPF apparatus in the previously-described embodiment.

Another embodiment of the DPF apparatus according to the present invention will now be described.

Figure 5:
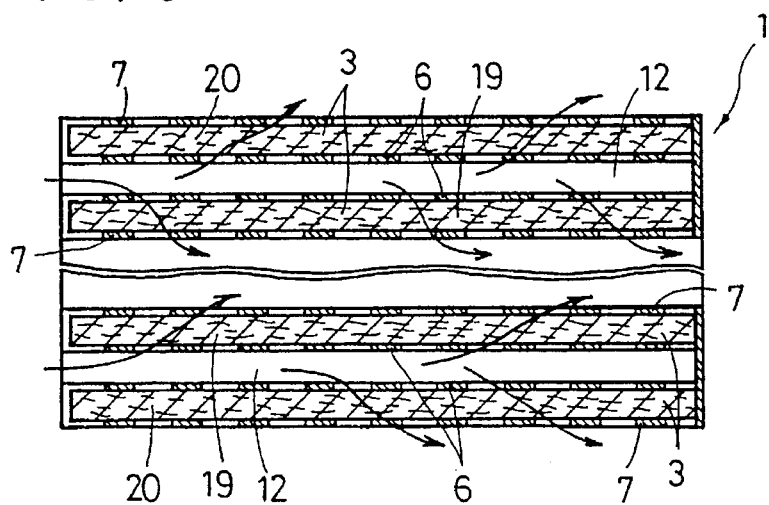
FIG. 5 is a sectional view showing another example of the main filter in the diesel particulate filter apparatus of FIG. 1.
Figure 6:
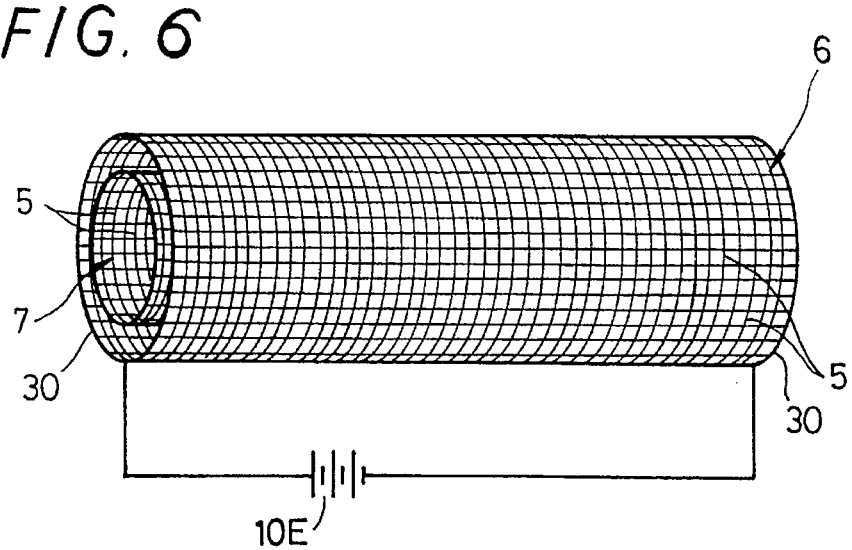
FIG. 6 is a perspective view showing an example of a metal net provided on the outer surface of the main filter of FIG. 5.
Figure 7:
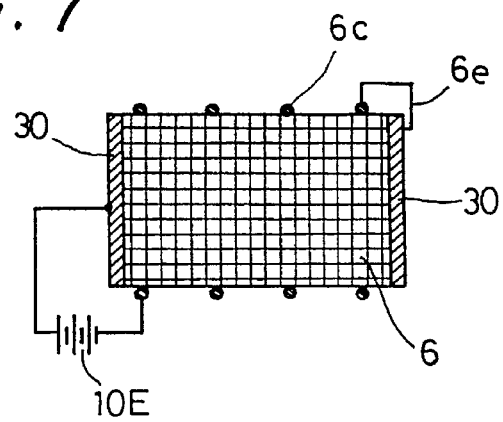
FIG. 7 is an explanatory drawing showing another example of the metal net provided on the outer surface of the main filter of FIG. 5 and an example of connecting a metal net and a composite coil together.

In the DPF apparatus in this embodiment, the metal nets 6 provided on both surfaces of filter bodies 3 can be formed as heaters as shown in FIGS. 5, 6 and 7. Each wire rod 5 constituting the metal nets 6 comprise as shown in, for example, FIG. 3 a core member 31 of Ni—Cr alloy, an intermediate member 32 made of a material of a high resistance temperature coefficient, such as Ni and coating the core member 31, and a layer of coating (outer member) 33 formed on the intermediate member 32 out of corrosion resisting $Al_2O_3$ or $ZrO_2$. The core member 31 is formed out of a material of a low resistance temperature coefficient and a large specific electric resistance value, i.e. a Ni—Cr alloy. Concretely speaking, the core member 31 comprises a steel material containing 18.8% each of Ni and Cr, or a nichrome wire containing 60–80% of Ni and 12–20% of Cr. The intermediate member 32 covers the core member 31, and is formed out of a material of a high resistance temperature coefficient and a small specific electric resistance value, i.e. Ni.

In the wire rod 5 constituting the metal net 6, a percentage of a cross-sectional area of the core member 31 comprising a Ni—Cr alloy with respect to a total cross-sectional area of the wire rod 5 is set to 60–85%, a percentage of a cross-sectional area of the intermediate member 32 comprising Ni with respect to a total cross-sectional area of the wire rod 5 40–15%, and a percentage of a cross-sectional area of the layer of coating 33 of $Al_2O_3$ or $ZrO_2$ with respect to a total cross-sectional area of the wire rod 5 10–20%. The metal net 6 is formed by wire rods 5 of a Ni—Or steel material to a latticed structure as shown in FIG. 7, and series-connected to the power source 10E via a composite coil 6C as a reinforcing coil and a line 6e. The metal net 6 and composite coil 6C are furnished with an electric power self-controllability so that the metal net 6 can be heated to a uniform temperature. Since the core members of the wire rods of the metal net 6 can be made selectively of a material of a large volume resistance value, the metal net can be formed to smaller dimensions, and the thermal capacity of the filter bodies 3 can be reduced. Moreover, a composite wire, i.e. the coil 6C can be utilized as a reinforcing coil and the rigidity of the metal net 6 can be increased.

The metal net 6 can be made as follows. For example, a metal net of a latticed structure is made of stainless steel to which 60% of Ni and 12–20% of Cr are added. This metal net is immersed in a Ni plating bath to plate the surface thereof with the metal to obtain a composite metal net. The surface of this composite metal net is then coated with Al, which is oxidized in oxygen to form $Al_2O_3$ on the surface of the composite metal net. When an electric current is supplied to terminals provided at both ends of the metal net 6 thus formed, the overall resistance value thereof increases owing to the rigidity of the stainless steel wires and the heat resistance and high resistance temperature coefficient of Ni wires, so that unevenness of the temperature rarely occurs. The physical properties of Ni and nichrome are as follows. specific electric resistance of Ni is 6.93 μΩcm, and that of nichrome 109 μΩcm. The resistance temperature coefficient of Ni is 0.0062, and that of nichrome 0.0020. The thermal expansion coefficient of Ni is $13 \times 10^{-6}$, and that of nichrome $13.7 \times 10^{-6}$.

The wire rods constituting the metal net 6 have a current self-controlling function. Since the resistance temperature coefficient of Ni wires is high, the resistance value thereof increases as the temperature increases, whereby the electric current is controlled. For example, let 8 equal the diameter of the core member 31 of nichrome of the wire rod of a diameter 10, 2 the diameter of the intermediate member 32 of Ni, $K_1$ the specific resistance of nichrome, $K_2$ the specific resistance of Ni, $R_1$ a resistance value at normal temperature of nichrome, $R_2$ a resistance value at normal temperature of Ni, $A_1$, $A_2$ cross-sectional areas per unit length of the wire rod, and L the length of the wire rod. The following equations are then established.

$$R_1 = (L/A_1)K_1 = (L/16\ \pi) \cdot 109 = 6.8(L/\pi)$$

$$R_2 = (L/A_2)K_2 = (L/16\ \pi) \cdot 6.98 = 1.55(L/\pi)$$

When the temperature of the wire rod is 900° C., the resistance of the nichrome is assumed to be $R_3$, and that of Ni $R_4$. When calculations are made on the basis of a unit length, the following equations are established, wherein T represents an increased temperature, and $\alpha_1$, $\alpha_2$ resistance temperature coefficients.

$$R_3 = R_1(1 + \alpha_1 T) = 6.8(1 + 0.002 \times 900) = 19.04$$

$$R_4 = (R_2(1 + \alpha_2 T) = 1.55(1 + 0.0062 \times 900) = 10.20$$

$$R_1 + R_2 + 6.8 + 1.55 = 8.35(\mu\Omega)$$

$$R_3 + R_4 = 19.04 + 10.20 = 29.24(\mu\Omega)$$

$$(R_3 + R_4)/(R_1 + R_2) = 29.24/8.35 = 3.5$$

Accordingly, if it is necessary that an electric current of 200 A flows to the metal net at normal temperature, the electric current is reduced to 57A at 900° C. (Namely, 200/3.5=57)

What is claimed is:

1. A diesel particulate filter apparatus comprising filters provided in an exhaust system for a diesel engine and adapted to collect particulates contained in an exhaust gas discharged from said diesel engine, and heaters for use in incinerating the particulates collected by said filters, said filters being formed by cylindrical filter bodies made by laminating long ceramic fiber materials, metal nets being provided on both surfaces of said filter bodies, a metal net in said metal nets which is positioned at least upstream a flow of said exhaust gas forming said heater comprising a conductive material, non-conductive twisted fiber threads used to fix said filter bodies being wound therearound.

2. A diesel particulate filter apparatus according to claim 1, wherein said twisted fiber threads comprise any one of ceramic threads and ceramic material-coated threads.

3. A diesel particulate filter apparatus according to claim 1, wherein said filter bodies are formed by laminating at random long ceramic fiber materials comprising SiC or SiC containing Ti and Ta, or weaving said long ceramic fiber materials by locally crossing the same.

4. A diesel particulate filter apparatus according to claim 1, wherein said filter bodies are formed cylindrically as a whole by long fiber materials of a plate type structure or a bellows-like structure.

5. A diesel particulate filter apparatus according to claim 1, wherein said metal nets of a conductive material are formed as heaters comprising ceramic material-coated heat resisting metal coils, said heaters being provided in contact with said filter bodies.

6. A diesel particulate filter apparatus according to claim 5, wherein said twisted fiber threads are wound in contact with the outer sides of said filter bodies with said heat resisting metal coils provided in contact with the inner sides thereof when said apparatus has a structure in which said exhaust gas is introduced into said cylindrical filter bodies from the inner sides thereof to the outer sides thereof.

7. A diesel particulate filter apparatus according to claim 5, wherein said twisted fiber threads are wound in contact with the inner sides of said filter bodies with said heat resisting metal coils provided in contact with the outer sides thereof when said apparatus has a structure in which said exhaust gas is introduced into said cylindrical filter bodies from the outer sides thereof to the inner sides thereof.

8. A diesel particulate filter apparatus according to claim 5, wherein a cross-sectional area of wire rods constituting said heat-resisting metal coils is set not more than ⅓ of the sum of a total cross-sectional areas of said metal nets.

9. A diesel particulate filter apparatus according to claim 5, wherein wire rods constituting said heat resisting metal coils are coated with Ni, $Al_2O_3$ or $ZrO_2$ and said heat resisting metal coils are series-connected to said metal nets.

10. A diesel particulate filter apparatus according to claim 1, wherein heaters made of said metal nets are provided in an opposed state on both sides of said filter bodies.

11. A diesel particulate filter apparatus according to claim 1, said metal nets constituting said heaters provided on the outer surfaces of said filter bodies are made of wire rods each of which comprises a core member formed out of a material of a low resistance temperature coefficient and a large specific electric resistance value, and an intermediate member coating said core member and comprising a material of a high resistance temperature coefficient and a small specific electric resistance value.

12. A diesel particulate filter apparatus according to claim 11, wherein said core member is made of a steel material containing 18.8% each of Ni and Cr or a nichrome wire containing 60–80% of Ni and 12–20% of Cr, said intermediate member being formed out of Ni.

13. A diesel particulate filter apparatus according to claim 12, wherein a cross-sectional area of said core member comprising Ni—Cr alloy accounts for 60–85% of a total cross-sectional area of said wire rod, a cross-sectional area of said intermediate member comprising Ni accounting for 40–15% of a total cross-sectional area of said wire rod, said layer of coating of $Al_2O_3$ or $ZrO_2$ being formed on said wire rod so as to increase a total cross-sectional area of said wire rod by 10–20%.

14. A diesel particulate filter apparatus according to claim 12, wherein said metal nets comprising a Ni—Cr steel material and said wire rods are series-connected together, said metal nets and said wire rods being brought close to one another, whereby said metal nets and said wire rods are furnished with an electric power self-controllability.

15. A diesel particulate filter apparatus according to claim 11, wherein said wire rod is covered with a layer of coating comprising corrosion resisting $Al_2O_3$ or $ZrO_2$.

16. A diesel particulate filter apparatus according to claim 11, wherein said metal nets are formed to a latticed structure in which said wire rods constituting said metal nets cross one another and are joined together.

17. A diesel particulate filter apparatus comprising filters provided in an exhaust system for a diesel engine and adapted to collect particulates contained in an exhaust gas discharged from said diesel engine, and heaters for use in incinerating the particulates collected by said filters, said filters being formed by cylindrical filter bodies made by laminating long ceramic fiber materials, metal nets being provided on both surfaces of said filter bodies, a metal net out of said metal nets which is positioned at least upstream a flow of said exhaust gas being made of a conductive material, ceramic material-coated heat resisting metal coils which constitute said heaters being provided in contact with said filter bodies, fiber twistings for use in fixing said filter bodies being wound around said filter bodies, said filter bodies comprising a main filter, and a sub-filter provided in a bypass cylinder, which is provided in a central portion of said main filter, so as to extend in parallel with a flow of said exhaust gas with respect to said main filter, said sub-filter being provided on an exhaust gas introducing upstream side thereof with a bypass valve for opening and closing said bypass cylinder, said bypass valve being opened and closed by an actuator.

18. A diesel particulate filter apparatus according to claim 17, wherein said main filter is adapted to open said sub-filter immediately when the temperature and exhaust gas resistance of the former are not lower than a predetermined level and higher than a predetermined level respectively during a particulate collecting operation thereof, to put said heaters into operation by supplying an electric current thereto.

19. A diesel particulate filter apparatus according to claim 17, wherein said bypass cylinder is provided therein with a safety valve.

* * * * *